(12) United States Patent
Lehmann et al.

(10) Patent No.: US 8,905,479 B2
(45) Date of Patent: Dec. 9, 2014

(54) FITTING FOR A VEHICLE SEAT

(75) Inventors: Ulrich Lehmann, Alfter (DE); Martin Stilleke, Recklinghausen (DE); Christian Jokiel, Heiligenhaus (DE); Artur Komainda, Wülfrath (DE); Eric Blass, Remscheid (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 117 days.

(21) Appl. No.: 13/643,286

(22) PCT Filed: Apr. 1, 2011

(86) PCT No.: PCT/EP2011/001661
§ 371 (c)(1),
(2), (4) Date: Jan. 4, 2013

(87) PCT Pub. No.: WO2011/134584
PCT Pub. Date: Nov. 3, 2011

(65) Prior Publication Data
US 2013/0207433 A1    Aug. 15, 2013

(30) Foreign Application Priority Data

Apr. 28, 2010  (DE) .......................... 10 2010 018 952

(51) Int. Cl.
*B60N 2/225*  (2006.01)
(52) U.S. Cl.
CPC ............... *B60N 2/225* (2013.01); *B60N 2/2252* (2013.01)
USPC ....................................................... 297/362
(58) Field of Classification Search
CPC .................................................. B60N 2/2254
USPC ....................................................... 297/362
See application file for complete search history.

(56) References Cited

U.S. PATENT DOCUMENTS 6,799,806 B2   10/2004   Eppert et al.
6,918,635 B2 *  7/2005   Finner et al. ................. 297/362
(Continued)

FOREIGN PATENT DOCUMENTS

DE   44 36 101 A1   6/1995
DE   44 36 111 C1   1/1996
(Continued)

OTHER PUBLICATIONS

International Search Report dated Aug. 11, 2011 as received in corresponding PCT Application No. PCT/EP2011/001661.
(Continued)

*Primary Examiner* — Rodney B White
(74) *Attorney, Agent, or Firm* — Foley & Lardner LLP

(57) ABSTRACT

For a fitting for a vehicle seat, in particular for a motor vehicle seat, comprising a first fitting part and a second fitting part, which are in a transmission connection with each other by means of a spur gear and a ring gear, which mesh with each other, and comprising a rotating eccentric driven by a carrier for driving a relative rolling motion of the spur gear and the ring gear, wherein the first fitting part accommodates the eccentric, which is supported on the second fitting part, the fitting is associated with one of at least two load classes and comprises components that are parameterized in regard to the associated load class and components that are carry-over parts for all load classes, wherein the fitting parts are parameterized components and the eccentric is one of the carry-over parts.

10 Claims, 5 Drawing Sheets

(56) References Cited

U.S. PATENT DOCUMENTS

Figure 1:
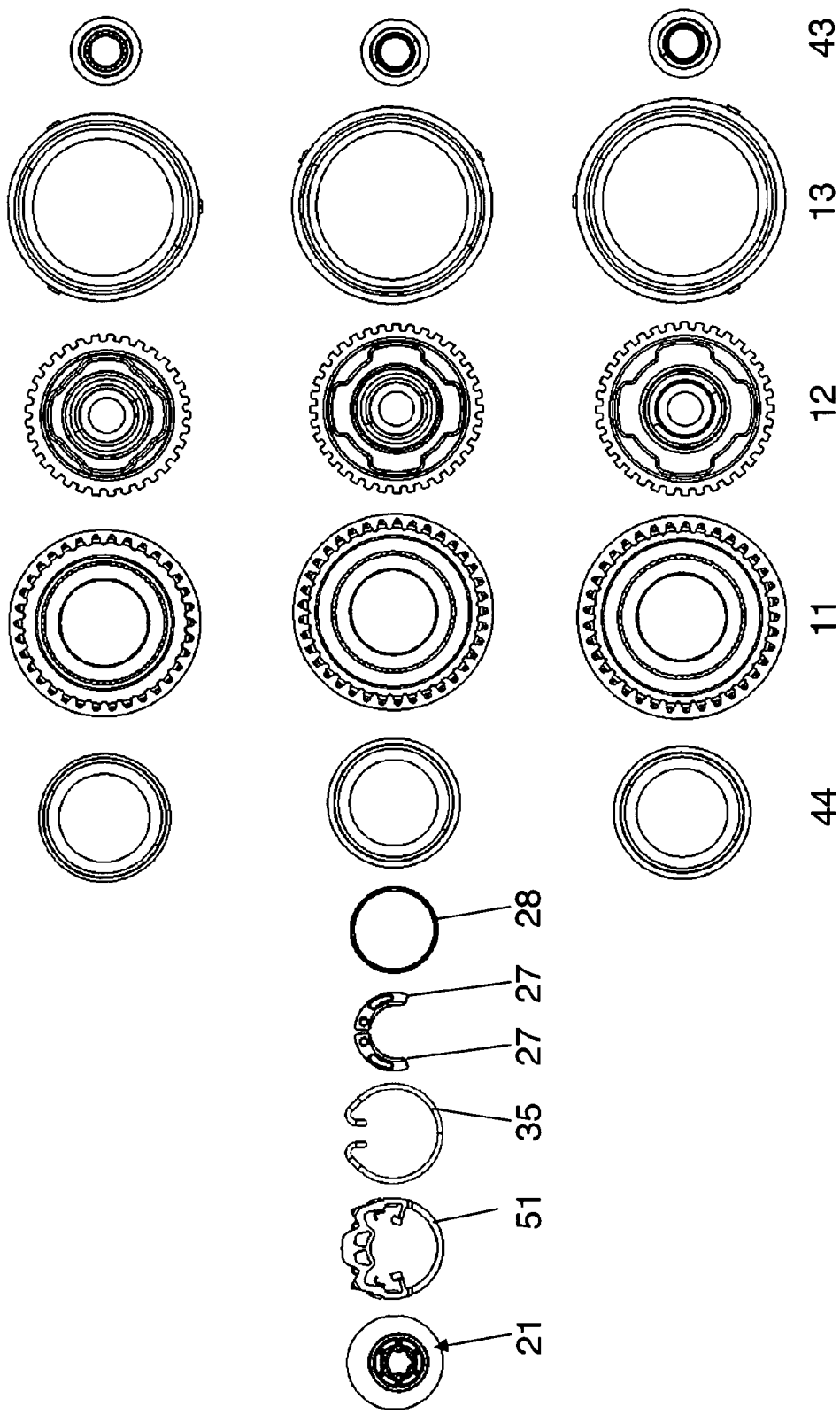

| | | | |
|---|---|---|---|
| 7,090,298 B2* | 8/2006 | Lange | 297/362 |
| 7,188,903 B2* | 3/2007 | Finner et al. | 297/362 |
| 7,281,765 B2* | 10/2007 | Scholz et al. | 297/362 |
| 7,314,250 B1 | 1/2008 | Eblenkamp et al. | |
| 7,455,361 B2* | 11/2008 | Stemmer et al. | 297/362 |
| 7,571,962 B2 | 8/2009 | Thiel et al. | |
| 7,607,737 B2* | 10/2009 | Liebich et al. | 297/362 |
| 7,648,203 B2* | 1/2010 | Voss et al. | 297/362 |
| 7,677,665 B2* | 3/2010 | Eppert et al. | 297/362 X |
| 7,753,450 B2* | 7/2010 | Eppert et al. | 297/362 |
| 7,789,464 B2* | 9/2010 | Stemmer et al. | 297/362 |
| 8,033,606 B2* | 10/2011 | Mitsuhashi | 297/362 |
| 8,262,165 B2* | 9/2012 | Mitsuhashi | 297/362 |
| 8,336,962 B2* | 12/2012 | Thiel et al. | 297/362 |
| 8,434,961 B2* | 5/2013 | Beneker et al. | 297/362 X |
| 8,460,145 B2* | 6/2013 | Mitsuhashi | 297/362 X |
| 8,485,605 B2* | 7/2013 | Mitsuhashi | 297/362 |
| 8,590,972 B2* | 11/2013 | Jiang et al. | 297/362 |
| 8,616,646 B2* | 12/2013 | Deegener et al. | 297/362 |
| 2005/0179297 A1* | 8/2005 | Finner et al. | 297/362 |
| 2006/0290187 A1* | 12/2006 | Scholz et al. | 297/362 |
| 2007/0290540 A1* | 12/2007 | Voss et al. | 297/362 |
| 2008/0136241 A1* | 6/2008 | Stemmer et al. | 297/362 |
| 2008/0136242 A1* | 6/2008 | Stemmer et al. | 297/362 |
| 2009/0102265 A1* | 4/2009 | Eppert et al. | 297/362 |
| 2009/0127910 A1 | 5/2009 | Stilleke et al. | |
| 2009/0224589 A1* | 9/2009 | Beneker et al. | 297/362 |
| 2010/0013287 A1* | 1/2010 | Mitsuhashi | 297/362 |
| 2010/0013288 A1* | 1/2010 | Mitsuhashi | 297/362 |
| 2011/0156463 A1* | 6/2011 | Thiel et al. | 297/362 |

FOREIGN PATENT DOCUMENTS

| | | |
|---|---|---|
| DE | 195 48 809 C1 | 5/1997 |
| DE | 199 38 666 A1 | 2/2001 |
| DE | 10 2004 007 045 B3 | 6/2005 |
| DE | 10 2004 013 272 B3 | 1/2006 |
| DE | 101 57 273 B4 | 1/2006 |
| DE | 10 2005 028 779 A1 | 12/2006 |
| DE | 10 2005 046 35 7 A1 | 3/2007 |
| DE | 10 2007 059 51 0 B3 | 2/2009 |
| DE | 10 2007 042 602 A1 | 3/2009 |
| DE | 20 2009 007 52 0 U1 | 8/2009 |
| DE | 20 2009 007 521 U1 | 8/2009 |
| DE | 10 2008 028 475 A1 | 11/2009 |
| DE | 10 2008 028 102 A1 | 12/2009 |
| DE | 10 2008 028 103 A1 | 12/2009 |
| DE | 2020090 15 236 U1 | 3/2011 |
| DE | 10 2010 018 95 2 A1 | 11/2011 |
| WO | WO-02/064397 A1 | 8/2002 |
| WO | WO-2008/080999 A1 | 7/2008 |
| WO | WO-2009/149875 A2 | 6/2009 |

OTHER PUBLICATIONS

Translation of the international preliminary report on patentability received in connection with international application No. PCT/EP2011/001661; dtd Nov. 8, 2012.

* cited by examiner

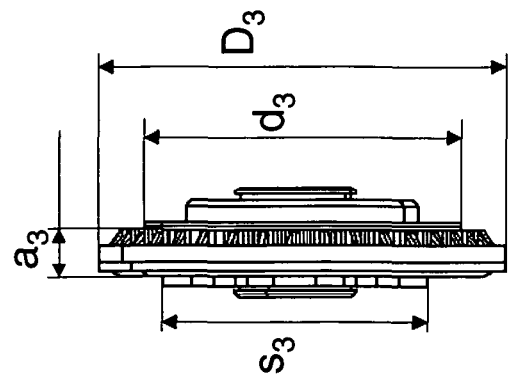
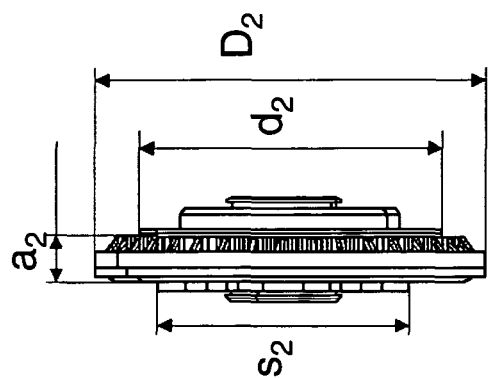
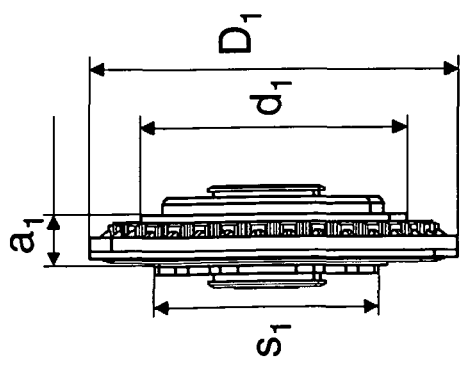
Fig. 3

FITTING FOR A VEHICLE SEAT

CROSS REFERENCE TO RELATED APPLICATIONS

The present application is a National Stage of International Application No. PCT/EP2011/001661 tiled on Apr. 1, 2011, which claims the benefit of German Patent Application No. 10 2010 018 952.9 filed on Apr. 28, 2010, the entire disclosures of which are incorporated herein by reference.

The invention relates to a fitting for a vehicle seat having the features of the preamble of claim 1.

A fitting of this type is known from U.S. Pat. No. 7,571,962 B2. The first fitting part and the second fitting part are in geared connection with each other by means of an eccentric epicyclic gear unit, in order to adjust the inclination of the backrest. It is disadvantageous that an adaptation of the known fitting to project-specific strength requirements is possible only with difficulties or not possible at all.

The object of the invention is to improve a fitting of the type mentioned in the introduction. This object is achieved according to the invention by a fitting having the features of claim 1. Advantageous configurations are the subject-matter of the subordinate claims.

The concept of load classes resolves the requirements on strength (in the event of a crash) in the relationship between dimensioning and material savings. The concept of identical parts takes into account that some components, in particular the outer components, have a bigger influence on strength and are therefore parametrized with respect to load classes, while other components, in particular the inner components, have a bigger influence on retaining and on actuating, i.e. can be identical parts with respect to properties such as clearance, actuating forces, strain sensitivity. The use of identical parts simplifies manufacture of the fitting components.

The parametrized components have, among them, a similar geometry, but they differ in their dimensions and in the proportion of these dimensions with respect to each other (this can also have an effect on translation). The two fitting parts are parametrized components and thus include further components which cooperate with s them, such as an enclosing ring, or which serve as an interface to the identical parts, as, for example, a securing ring or a sealing ring for the driver. The similar geometry shall not be intended in the narrow sense of similarity theory, but in a broader sense, as becomes evident in the exemplary embodiment with the different load classes.

The use of an eccentric epicyclic gear system enables the inclination of the backrest of a vehicle seat to be adjusted continuously. The saving of a central pinion compared with a planetary gear system leads to the occurrence of a wobbling movement which is superimposed on the relative rotation of the fitting parts. The eccentric epicyclic gear system can be driven manually or by a motor. The toothed ring is configured preferably on the first fitting part and the toothed wheel on the second fitting part.

The basic component of retaining the eccentric epicyclic gear system is provided by the friction between the eccentric and one of the two fitting parts, preferably the second fitting part which preferably has a collar for supporting the eccentric. The preferably provided wedge segments which define the eccentric serve for both, retaining and driving the rolling movement of toothed wheel and toothed ring. A preferably additionally provided retaining element serves for retaining the fitting under dynamic loads.

The configuration of the toothed ring on the first fitting part which receives the eccentric and the configuration of the toothed wheel on the second fitting part which supports the eccentric saves material and building space, by the fact that the toothed wheel can be configured on the radially outer edge of the second fitting part (which then preferably engages over an enclosing ring which is fixed to the first fitting part) and nevertheless there are sufficiently large connecting areas available on the second fitting part, for mounting the fitting. The substantially flat shape of the enclosing ring, which does no longer completely engage over the first fitting part, requires less material compared to the known, L-shaped profiled configuration, resulting in savings of weight and costs. Deviations from the flat shape can be, for example, axially protruding centering sections which are distributed in the circumferential direction, and by means of which the enclosing ring can be pre-positioned on the first fitting part.

The fittings according to the invention preferably serve for adjusting the inclination of the backrest of vehicle seats in motor vehicles, but they can be used also at other points of the vehicle seats (for example in seat-height adjusting mechanisms), of the motor vehicles, of other vehicles or outside the vehicle sector.

Figure 2:
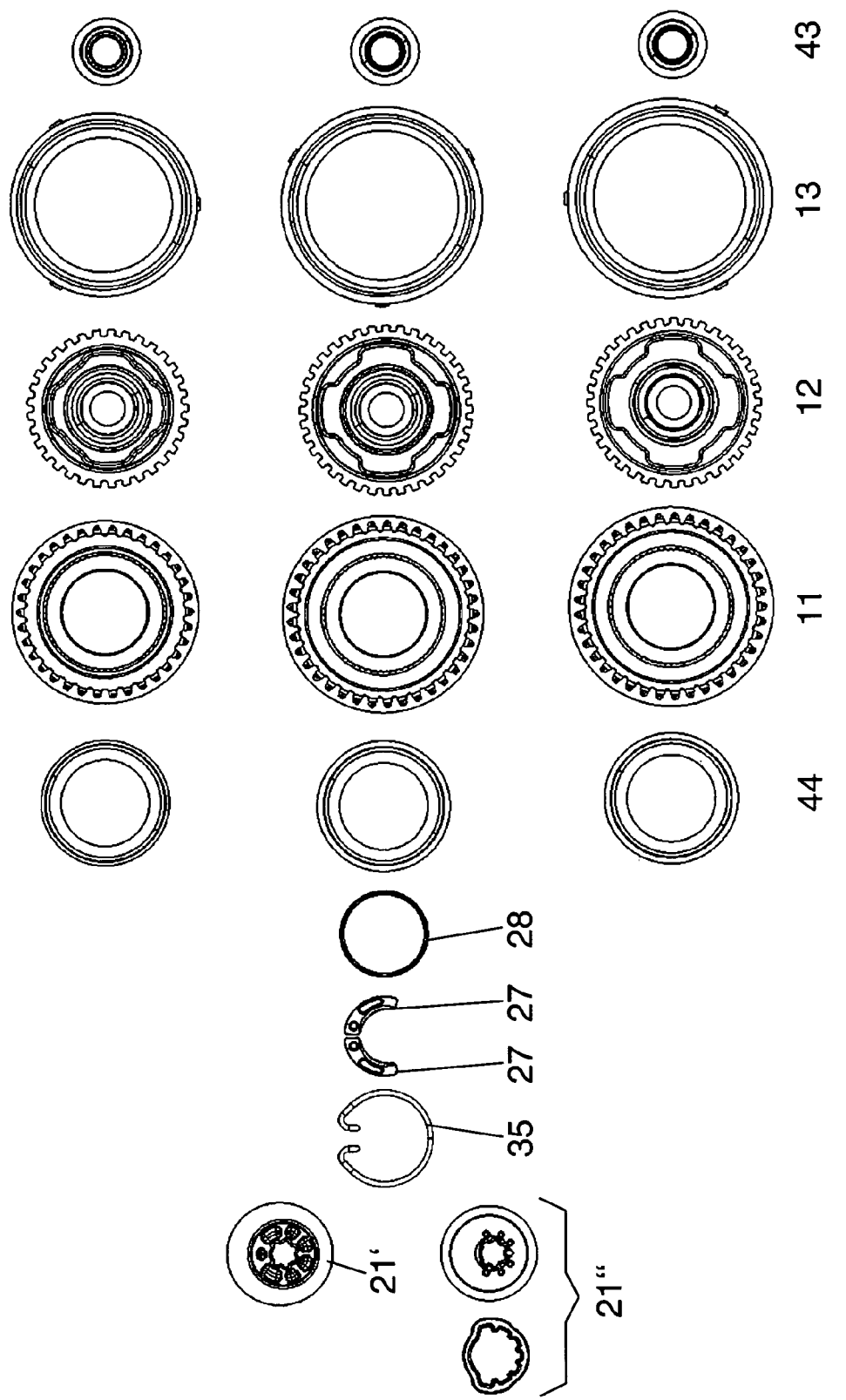
Figure 4:
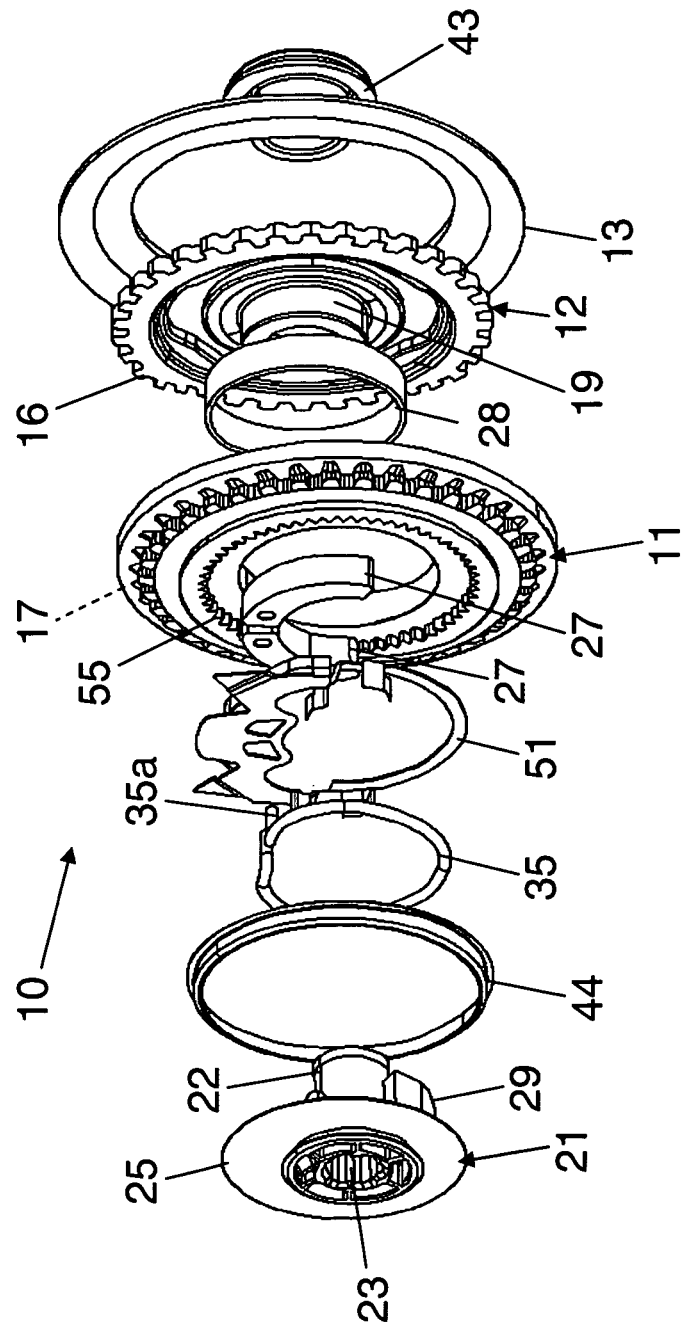
Figure 6:
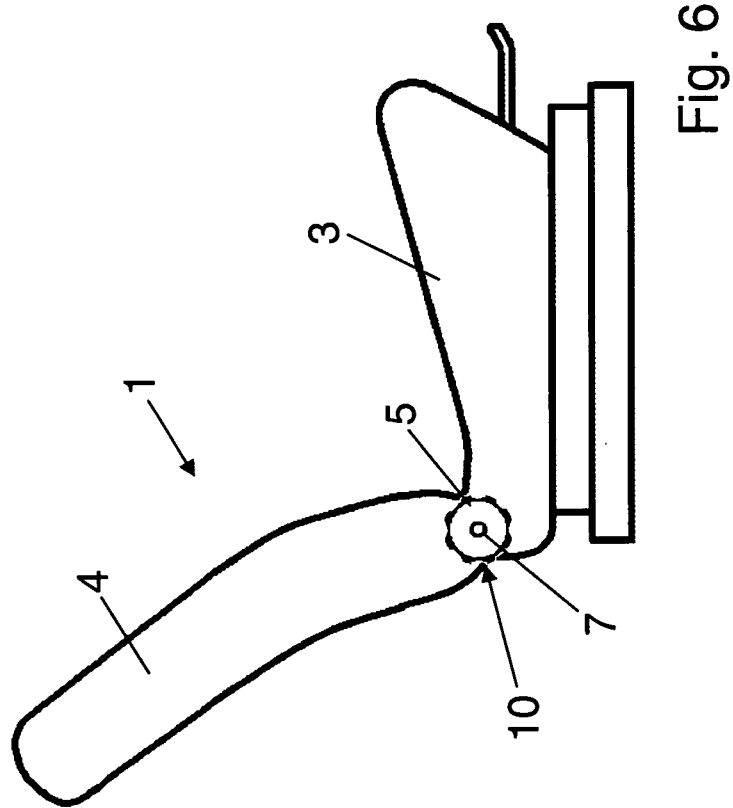
Figure 5:
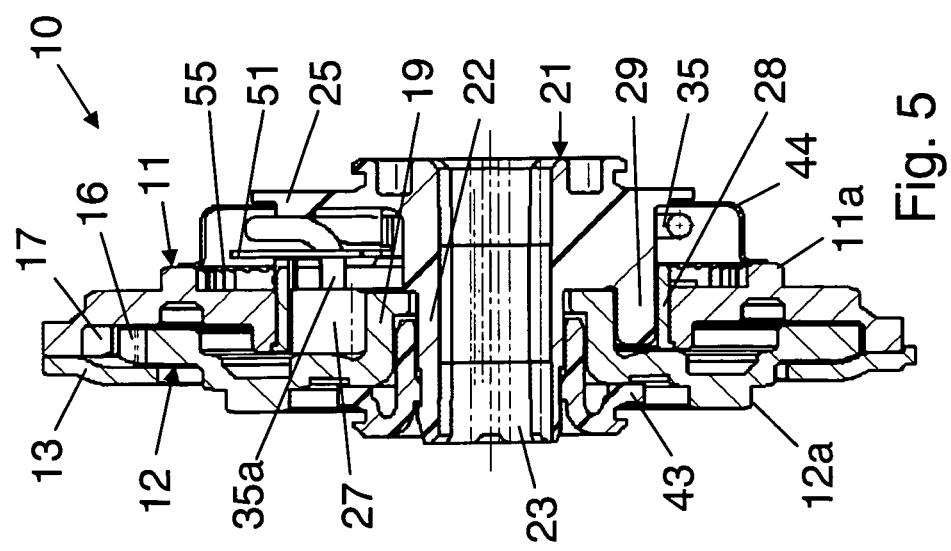

The invention is explained in more detail hereinafter with reference to an exemplary embodiment shown in the drawing, in which:

FIG. 1 shows a view of the identical parts and of the parametrized components of three load classes, FIG. 2 shows an extension with two further types of drivers, which are identical parts with respect to the three load classes, FIG. 3 shows a side view of the assembled fittings of the three load classes, FIG. 4 shows an exploded view of a fitting, FIG. 5 shows a cut through a fitting of FIG. 4, and FIG. 6 shows a schematic view of a vehicle seat.

A vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the drive shaft 7 engages in a fitting 10 so that it is rotationally secure. The drive shaft 7 defines the adopted directional data of a cylinder coordinate system.

The fitting 10 has a first fitting part 11 and a second fitting part 12 which can be rotated relative to one another. Each of the two fitting parts 11 and 12 can be approximately inscribed in a circular disc shape. In order to absorb the axially acting forces, i.e. in order to hold the fitting parts 11 and 12 axially together, an enclosing ring 13 is provided. Such a method of holding parts together by means of an enclosing ring is described, for example, in U.S. Pat. No. 6,799,806 B2. The enclosing ring 13 which is preferably composed of metal is fixedly connected, for example welded or bent over (at least partly in the circumferential direction), with one of the two fitting parts 11 and 12, in the present case with the first fitting part 11 in an outer end section. By means of an end section which is facing radially inward, the enclosing ring 13 engages over the other one of the two fitting parts 11 and 12, which is movable relative to it, radially outside, optionally with the interposition of a separate sliding ring, without impeding the relative rotation of the two fitting parts 11 and 12. From a structural point of view, the two fitting parts 11 and 12 together (with the enclosing ring 13) consequently form a disc-shaped unit.

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 can, however, also be exchanged, i.e. the first fitting part 11 would then be fixed with respect to the seat part and the second fitting part 12 would be fixed with respect to the backrest. The fitting 10 consequently is in the force flow between the backrest 4 and the seat part 3, this is why the two fitting parts 11 and 12 are composed of metal, preferably of steel. For mounting, the first fitting part 11 has, on its front end which is facing axially outward, a ring shoulder 11a, while the second fitting part 12 has a star shoulder 12a. The ring shoulder 11a and the star shoulder 12a then engage in suitable receptacles of the structures of backrest 4 and seat part 3 and are preferably welded with the end section of the receptacles.

The fitting 10 is in the form of a gear fitting in which a first fitting part 11 and a second fitting part 12 are connected to each other by means of a gear unit for adjustment and fixing in position, to be more precise, by means of an eccentric epicyclic gear system, which in the present case is self-locking as described, for example, in DE 44 36 101 A1.

In order to form the gear unit, an externally toothed toothed wheel 16 is formed on the second fitting part 12, and an internally toothed toothed ring 17 is formed on the first fitting part 11, the toothed wheel and the toothed ring meshing with each other. The diameter of the tip circle of the external toothing of the toothed wheel 16 is smaller by at least the depth of one tooth than the diameter of the root circle of the internal toothing of the toothed ring 17. A corresponding difference in the number of teeth of the toothed wheel 16 and the toothed ring 17 of at least one tooth permits a rolling movement of the toothed ring on the toothed wheel. The toothed wheel 16 and the toothed ring 17 are formed preferably by means of one single stamping process which simultaneously punches the fitting parts 11 and 12 from their initial material. Alternatively, the fitting parts 11 and 12 can be manufactured—with similar geometries and same functions—by massive forming (preferably cold-impact extrusion or hot extrusion). In the present case, the toothed wheel 16 forms the radially outer edge of the second fitting part 12, i.e. radially outward the second fitting part 12 is flush with the toothed wheel 16.

One of the two fitting parts 11 and 12, has a collar 19, in the present case the second fitting part 12, concentrically to the toothed wheel 16. The collar 19 can be integrally formed on (i.e. formed in one piece with) said fitting part as a collar formation or be secured thereto in the form of a separate sleeve. A driver 21 is supported rotatably in the collar 19 by means of a hub 22. The driver 21 is preferably composed of plastics material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disc 25 which is formed in one piece with the hub 22 and which has a larger diameter than the hub 22.

Supported on the collar 19—with their curved inner surfaces—are two wedge segments 27 which bear—with their curved outer surfaces—the other of the two fitting parts 11 and 12, in the present case the first fitting part 11. For this purpose, a receptacle of the last-named fitting part is coated with a slide bearing bush 28 which is preferably pressed in to be rotationally fixed, and against which the outer surfaces of the wedge segments 27 bear. The notions "support" and "bear" shall not be limited to a defined direction of the flow of forces by the fitting 10, since this direction depends on the mounting of the fitting 10.

The driver 21 has—spaced radially from the hub 22—a driver segment 29 which engages with clearance between the narrow sides of the wedge segments 27 and which is formed in one piece with the covering disc 25 and the hub 22. The mutually facing broad sides of the wedge segments 27 each receive, with a respective recess defined by projecting sections of material, a respective angled end finger 35a of an omega spring 35. The spring 35 acts upon the wedge segments 27 in the circumferential direction, in particular in order to press them apart, it being possible during operation for the broad sides of the wedge segments 27 to touch and act on each other.

The driver 21 is secured axially on the outside of the fitting part provided with the collar 19 by a securing ring 43 which is preferably clipped on. The securing ring 43 extends in the axial direction along a part of the hub 22, so that the hub 22 does not directly bear against the inside of the collar 19 but, with the interposition of the securing ring 43, is supported in the collar 19 (and consequently the driver 21 is supported on the second fitting part 12). On the outside of the fitting part provided with the slide bearing bush 28 (in the present case of the first fitting part 11), a sealing ring 44 is provided between its radially outermost edge and the covering disc 25, such sealing ring being composed for example of rubber or of soft plastics material and being connected with, in particular clipped to, the covering disc 25. The sealing ring 44 can be composed also of metal and be tightly connected, for example welded, with the first fitting part 11, whereby the covering disc 25 is then movable relative to the sealing ring 44.

The wedge segments 27 (and the spring 35) define an eccentric which, in the extension of the direction of eccentricity, presses the toothed wheel 16 into the toothed ring 17 at an engagement site. When drive is effected by means of the rotating drive shaft 7 which rotates (several times), a torque is first of all transmitted onto the driver 21 and then, by means of the driver segment 29, onto the eccentric which is so defined and which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

To improve the dynamic operating characteristics, a retaining spring 51, as has been disclosed for example in DE 195 48 809 C1, is preferably additionally provided as retaining element. In the present case, the retaining spring 51 cooperates with a toothing 55 which is configured as a further toothed ring on the first fitting part 11. The retaining spring 51 retains the wedge segments 27 in the non-driven state (by the retaining spring retaining the spring 35 by bearing against the end fingers 35a) in the non-driven state and is released by the driven driver 21.

According to the invention, the fitting 10 can be carried out in different load classes. Of the components which lie in the force flow between backrest 4 and seat part 3, the inner components (or partial sections of components) are laid out identically for all load classes, that is to say particularly the collar 19 of the second fitting part 12 (more precisely the section of the collar 19 which is in contact with the wedge segments 27 with respect to inner diameter and outer diameter), the wedge segments 27, the slide bearing bush 28 and the receptacle of the first fitting part 11 coated by it. Correspondingly, the driver 21, the wedge segments 27, the spring 35, the retaining spring 51 and the slide bearing bush 28 are identical parts for all load classes, preferably also the sealing ring 44.

The outer components of the fitting 10 are laid out for the single load classes, that is to say particularly the first fitting part 11 with the toothed ring 17, the second fitting part 12 with the toothed wheel 16 and the enclosing ring 13. These outer components are parametrized, i.e. their dimensions depend on the load class. The toothed ring 17 and the toothed wheel 16 dominate herein. Their diameters and axial dimensions (depth) are important parameters, tooth height, tooth width and tooth spacing and thus indirectly also the number of teeth, too. According to these parameters of the toothed ring 17 and of the toothed wheel 16, the outer dimensions of the first fitting part 11 and of the fitting part 12 are determined, too, in particular the outer diameter and the axial dimension, and consequently also the outer dimensions of the enclosing ring 13.

Three load classes are preferred, one small load class (1500 Nm), one medium load class (2000 Nm) and one big load class (2500 Nm), which should be numbered in this order, wherein their numbering shall extend also to the parameters. The three load classes have axial dimensions a1, a2, a3 between the ring shoulder 11a and the star shoulder 12a, outer diameters D1, D2, D3 of the first fitting part 11 and of the enclosing ring 13, ring diameters d1, d2, d3 of the ring shoulder 11a (d1=52 mm, d2=60 mm and d3=60 mm) and star diameters s1, s2 and s3 of the star shoulder 12a (s1=44 mm, without arms 39.5 mm, s2=50 mm, without arms 42 mm and s3=50 mm, without arms 42 mm). The axial dimensions a1, a2, a3 increase by approximately 15% each (a1=8.5 mm±3%; a2=9.5 mm ±3%; a3=11.0 mm ±3%). Among the outer diameters D1, D2, D (D1=72.0 mm±3%; D2=77.0 Mm±3%; D3=78.0 mm±3%), the outer diameter D2 of the medium load class is by approximately 7% bigger than the outer diameter D1 of the small load class. Weight, too, increases by 20%-30% from load class to load class (depending on the material). The different axial dimensions a1, a2, a3 are preferably compensated by different securing rings 43. The considerably small outer diameter of the small load class causes a smaller ring diameter d1 of the the ring shoulder 11a (and a smaller star diameter s1 of the star shoulder 12a), so that, if applicable, the sealing ring 44 which bears against the ring shoulder 11a is no identical part, but that an own sealing ring 44 exists for the small load class, i.e. the sealing ring 44 is a parametrized component of the fitting 10.

In the small load class (1500 Nm), the first fitting part 11 preferably has a thickness of 3.0 mm±5%, a diameter of the tip circle of 62 mm±3%, a diameter of the root circle of 65 mm±3% and a number of teeth of preferably 34. In the medium load class (2000 Nm), the first fitting part 11 preferably has a thickness of 3.5 mm±5%, a diameter of the tip circle of 65 mm±3%, a diameter of the root circle of 70 mm ±3% and a number of teeth of preferably 37. In the big load class (2500 Nm), the first fitting part 11 preferably has a thickness of 4.0 mm±5%, a diameter of the tip circle of 65 mm±3%, a diameter of the root circle of 70 mm±3% and a number of teeth of preferably 37. The inner diameter of the receptacle for the slide bearing bush 28 is 33 mm±3% each. The first fitting part 11 is preferably composed of high-strength steel without heat treatment, alternatively of C20E steel which is hardened and tempered (heat-treated).

In the small load class (1500 Nm), the second fitting part 12 preferably has a thickness of 3.0 mm±5%, a diameter of the tip circle of 62 mm±3%, a diameter of the root circle of 57 mm±3% and a number of teeth of preferably 33. In the medium load class (2000 Nm), the second fitting part 12 preferably has a thickness of 3.5 mm±5%, a diameter of the tip circle of 67 mm±3%, a diameter of the root circle of 61 mm±3% and a number of teeth of preferably 36. In the big load class (2500 Nm), the second fitting part 12 preferably has a thickness of 4.0 mm±5%, a diameter of the tip circle of 67 mm±3%, a diameter of the root circle of 61 mm±3% and a number of teeth of preferably 36. The outer diameter of the collar 19 amounts to 21 mm±3% each. The second fitting part 12 is preferably composed of C20E steel which is hardened and tempered by heat treatment.

During production, the fitting 10 is assembled from the above-named identical parts and from parametrized components in the kind of a construction kit, i.e. one of the load classes is specified, and then—depending on this specified load class, the parametrized components which are assigned to the specified load class, and the components, which are identical parts for all load classes, are selected (and taken out of this construction kit), and the fitting 10 is assembled thereof. If the production lines for assembling are not completely separated, it can be advantageous to provide the differently parametrized components with different identifications, for example a different color for the plastic components.

The system of identical parts and parametrized components of the fitting 10 can be extended to the motor-driven versions, as is described in U.S. Pat. No. 7,314,250 B1 for a one-piece metal driver 21', for example of zinc or aluminum die casts, and in U.S. 2009/0127910 A1 for a two-piece driver 21" composed of a metal ring (preferably a sintered material) with driver segment 29 and a plastic component which is connected to it so as to be rotationally rigid, with a hub 22 and a covering disc 25. The relevant disclosure of the two named printed publications is expressly incorporated herein.

The three kinds of driver, that is so say the above-described driver in one piece 21 composed of plastic material (DE 44 36 111 A1), the driver in one piece 21' composed of metal (U.S. Pat. No. 7,314,250) and the two-piece driver 21" (U.S. 2009/0127910 A1) form a group. The driver must be selected from this group, but is still an identical part with respect to the load classes. In the two motor-driven versions with the metal driver 21' and with the two-piece driver 21", the retaining spring 51 is omitted, however.

LIST OF REFERENCE NUMERALS 1 vehicle seat
3 seat part
4 backrest
5 handwheel
7 drive shaft
10 fitting
11 first fitting part
11a a ring shoulder
12 second fitting part
12a star shoulder
13 enclosing ring
16 toothed wheel
17 toothed ring
19 collar
21 driver
21' metal driver
21" two-piece driver
22 hub
23 bore
25 covering disc
27 wedge segment
28 slide bearing bush 29 driver segment
35 spring
35a end finger
43 securing ring
44 sealing ring
51 retaining spring
55 toothing
a1,a2,a3 axial dimension
d1,d2,d3 ring diameter of the ring shoulder
D1,D2,D3 outer diameter
s1,s2,s3 star diameter of the star shoulder

The invention claimed is:

1. A fitting for a vehicle seat, comprising:
a first fitting part and a second fitting part which are in geared connection via a toothed wheel and a toothed ring, which mesh with each other, and a circumferential eccentric, driven by a driver, for driving a relative rolling movement of the toothed wheel and the toothed ring,
wherein the first fitting part receives the eccentric which is supported on the second fitting part,
wherein the fitting is assigned to one of at least two load classes, and the fitting comprises parametrized components which are parametrized with respect to the assigned load class, and identical parts which are identical for all of the load classes and can be used with different parametrized components appropriate for each respective load class,
wherein the first and second fitting parts are two of the parametrized components and the eccentric is one of the identical parts,
wherein outer diameters and axial dimensions of the first fitting part and the second fitting part are parametrized with respect to the assigned load class and differ from outer diameters and axial dimensions of first and second fitting parts of another of the at least two load classes.

2. The fitting according to claim 1,
wherein, as one of the parametrized components, an enclosing ring is provided, which axially holds together the first fitting part—which is provided with the toothed ring—and the second fitting part—which is provided with the toothed wheel—, forming a disc-shaped unit, and which is fixed to the first fitting part and engages over the second fitting part radially outside, wherein the enclosing ring has a substantially flat shape.

3. The fitting according to claim 1, wherein two wedge segments upon which a spring acts, define the eccentric, wherein the wedge segments and the spring are among the identical parts.

4. The fitting according to claim 1, wherein the first fitting part receives the eccentric, by a slide bearing bush which is one of the identical parts, which is concentric to the toothed ring, and that the second fitting part supports the eccentric by a collar, which is concentric to the toothed wheel.

5. The fitting according to claim 1,
wherein a retaining spring is provided as one of the identical parts, such retaining spring retaining the eccentric in the non-driven state of the fitting, by cooperating with a toothing which is configured on the first fitting part, and which releases the eccentric when it is driven by the driver.

6. The fitting according to claim 1, wherein the driver, which is one of the identical parts, is secured axially by a securing ring, which is one of the parametrized components and/or the driver is supported on the second fitting part.

7. The fitting according to claim 1,
wherein the driver which is one of the identical parts is sealed towards the first fitting part by a sealing ring which is one of the parametrized components.

8. The fitting according to claim 1, wherein the driver is configured as a one-piece driver composed of plastic material, as a one-piece driver composed of metal or as a two-piece driver, wherein all types are identical parts with respect to the load classes.

9. A vehicle seat, having at least one fitting according to claim 1, a seat part which is connected with one of the two fitting parts and a backrest which is connected with the other of the two fitting parts.

10. A method for assembling a fitting according to claim 1, wherein one of at least two load classes is specified, and then the parametrized components which are assigned to the specified load class and the components, which are identical parts for all load classes, are selected, and the fitting is assembled thereof.

* * * * *